United States Patent [19]

Schlenker

[11] Patent Number: 4,953,419
[45] Date of Patent: Sep. 4, 1990

[54] BALL SCREW RETURN SYSTEM
[75] Inventor: Theodore R. Schlenker, Troy, Mich.
[73] Assignee: Dana Corporation, Toledo, Ohio
[21] Appl. No.: 409,549
[22] Filed: Sep. 19, 1989
[51] Int. Cl.$^5$ .............................................. F16H 25/22
[52] U.S. Cl. ................................. 74/459; 74/424.8 R
[58] Field of Search ........................... 74/424.8 R, 459

[56] References Cited

U.S. PATENT DOCUMENTS

| 476,304 | 6/1892 | Pratt | 74/459 |
| 2,855,790 | 10/1958 | Smith | 74/459 |
| 3,512,426 | 5/1970 | Dabringhaus | 74/459 |
| 3,971,264 | 7/1976 | Detraz et al. | 74/459 |

FOREIGN PATENT DOCUMENTS

| 3635212 | 4/1988 | Fed. Rep. of Germany | 74/424.8 R |
| 1191661 | 11/1985 | U.S.S.R. | 74/459 |
| 627365 | 8/1949 | United Kingdom | 74/459 |

Primary Examiner—Allan D. Herrmann
Attorney, Agent, or Firm—F. B. McDonald

[57] ABSTRACT

A ball screw and nut assembly includes an improved ball return system designed to avoid abrupt directional changes in the recirculation path of ball bearings from one end of a nut to the other. A return tube, secured to the nut, is formed in two sections, each having a major leg and a minor leg. The ends of respective major legs are adapted to butt together along the centerline of the ball screw nut. The minor legs, joined by elbows to the major legs, are disposed at angles equal to ninety degrees minus the helix angle of the ball screw and nut. The nut contains transverse apertures at its respective ends to provide counterbores for support of the minor legs, each leg also extending tangentially to the groove in the nut at the location of its interface with the groove. The result is a return tube system which avoids abrupt directional changes in the travel path of the balls.

3 Claims, 3 Drawing Sheets

BALL SCREW RETURN SYSTEM

BACKGROUND OF THE INVENTION

This invention relates to ball screw assemblies having elongated screws of the type adapted for engagement with travelling nuts which move axially between limits along the screws. The typical ball screw assembly incorporates a pair of mating helical screw and nut grooves to accommodate a plurality of rolling balls which move along a helical path via the mating grooves, the balls being axially contained within the nut. At the end of its travel cycle, each ball enters a return tube positioned to transfer the ball from one end of the nut to its starting point at the opposite end.

To the extent that ball screw systems are approximately ninety percent efficient (by comparison, acme thread-nut systems are only thirty percent efficient), ball screws are commonly utilized in environments which require great precision. For example, ball screws are typically employed in x-y table positioning, industrial motion control, and various actuator systems. Ball screws are also utilized in a variety of applications requiring conservation of energy and weight, as for example in the actuation of flaps and other control surfaces of aircraft and missiles.

A major drawback in current ball screw assembly design, however, relates to ball return tube system efficiency. Currently available ball return tube designs are compromises, to the extent that although the tubes are positioned to tangentially pick up the balls from one end of the nut and return them to the opposite end, the tubes are not positioned to collect the balls in the most efficient manner. Typically, the balls are required to make an abrupt travel path change in traversing from the groove to the return tube and vice versa. The resulting efficiency losses are translated into unnecessary noise and heat. This is a particular problem in preloaded ball screw assemblies wherein the balls are under compressive loads against the grooves in which they travel.

SUMMARY OF THE INVENTION

The present invention provides a simple and inexpensive solution for correcting the noted inherent inefficiency of presently available ball return systems. The invention provides for design changes only to nut and return tube; no changes are required in either the balls or screw.

In the nut, each of the ball return apertures is oriented parallel to the helix angle of the groove in the nut. The apertures are typically already tangent to the mating groove; the latter feature is retained.

As for the tube, a presently preferred embodiment of the invention calls for two separate identical tubular members, each consisting of a major leg and a minor leg, wherein the major legs are oriented in an axially aligned, abutting, end-to-end relationship along the exterior of the nut. The minor legs extend into the apertures of the nut which provide counterbores for the tube ends. To the extent that the minor legs fit into and securely engage the apertures oriented parallel to the helix angle, it will be apparent that the minor legs are also oriented parallel to the helix angle of the nut groove. The resultant tube design avoids abrupt directional changes in the travel path of the balls, and provides a consequent reduction of noise and heat. Greater ball screw system efficiency is the ultimate product.

DETAILED DESCRIPTION OF A PREFERRED EMBODIMENT

Figure 1:
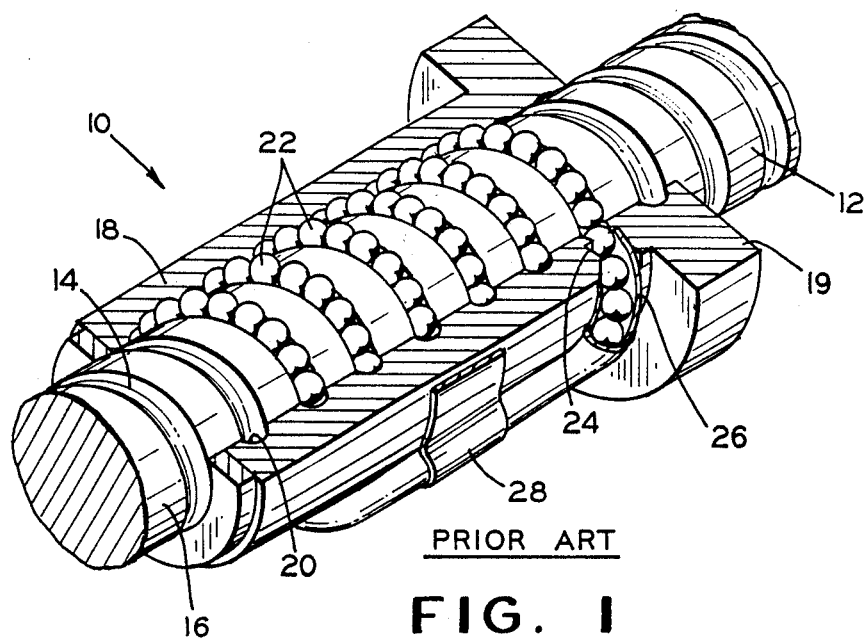
FIG. 1 is a fragmentary perspective view of a prior art ball screw assembly.

FIGS. 1–4 provide a background against which the present invention may be appreciated. Referring initially to FIG. 1, a prior art ball screw assembly 10 provides an axially extending elongated screw 12, shown fragmentarily. The screw 12 has a continuous helical groove 14 delineated by a continuous helical land 16. A nut 18 is adapted to move axially along the screw, the nut defining an interior mating helical groove 20 and including a traditional actuator flange 19. Disposed in the mating grooves 14, 16 of the nut and screw, for providing relatively frictionless rolling contact therebetween, are a plurality of ball bearings 22. The ball bearings 22, also referred to as balls, traverse a helical path within the mating grooves from one end of the nut to the other. A pair of spaced transversely oriented apertures 24 extend through respective ends of the nut to permit the balls to escape from one end of the nut and to be recirculated back into the opposite end. A ball return tube 26 communicates with the apertures 24 to accommodate recirculation, and a tube securement strap 28 is fixed to the body of the nut for holding the return tube in place.

Figure 2:
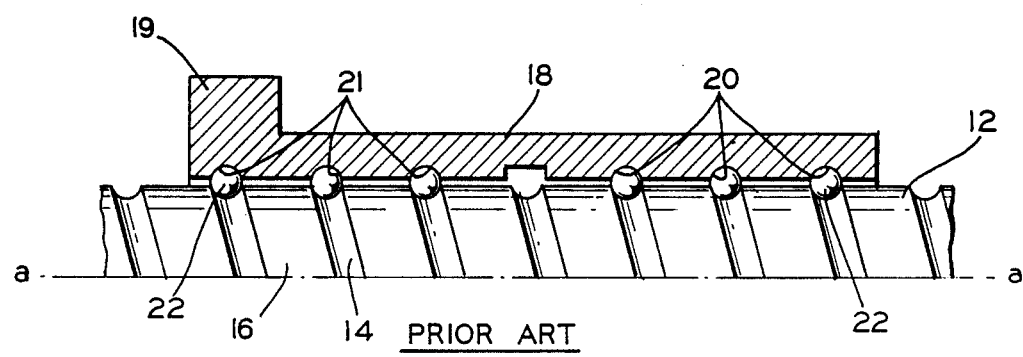
FIG. 2 is a fragmentary cross-sectional view of a preloaded prior art ball screw and nut assembly.

Referring to FIG. 2, the mechanism of a precision ground ball screw is more particularly shown, wherein the nut and screw cooperate to "preload" the balls. Specifically, it will be appreciated by those skilled in the art that a first set 20 of mating grooves in the nut (three grooves at the left hand portion) are slightly offset from those of a second set 21 (three grooves at the right hand portion). The result is that the balls are "cammed up" or "loaded" against the respective grooves of nut and screw. This feature alleviates the tendency of a ball screw assembly to "backlash" or to exhibit axial play between nut and screw members. However, a tendency of preloaded balls to ride between nut and screw under greater load forces will exacerbate energy losses associated with abrupt angular changes in ball travel. To the extent that most precision ball screw return systems are preloaded for backlash control, the ball return system of the present invention directly addresses this latter energy loss problem.

Figure 3:
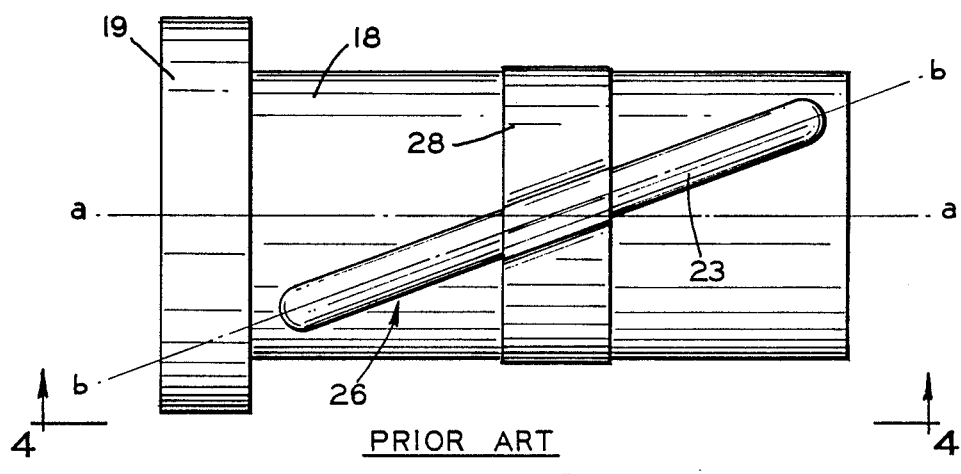
FIG. 3 is a plan view of a prior art nut and return tube.
Figure 4:
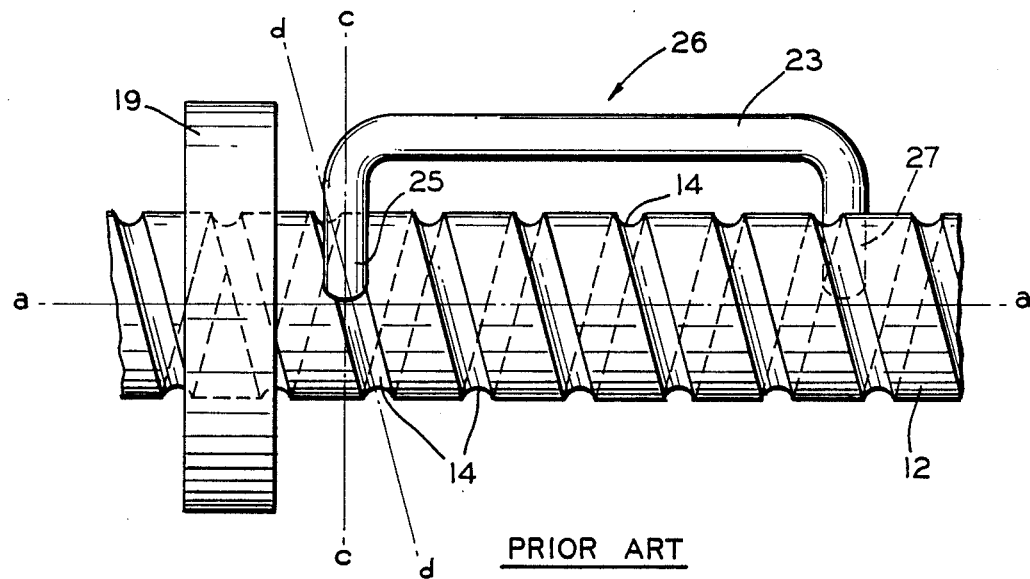
FIG. 4 is a fragmentary view depicting a standard positional relationship between a prior art return tube and a screw.

Referring to FIGS. 3 and 4, a conventional prior art ball return tube system is more particularly shown in greater detail. Typically, the major body portion 23 of the ball return tube 26 lies along an axis b—b, angularly offset from the axial centerline a—a of the nut and screw members, 18 and 12.

In FIG. 4, a greater appreciation of the energy loss problem of the prior art is facilitated by reference to the positional relationship with respect to the groove 14 of either of the ends 25 and 27 of the return tube 26. In particular, it is noted that the tube end 25 extends along a line c—c (orthogonal to the axis a—a of the screw and nut), while the groove 14 extends along a line d—d. The angle of intersection of the two lines is equal to the helix angle of the groove 14. It will be appreciated that whenever a ball traverses between the tube end 25 and the groove 14, the ball is forced to make an abrupt angular change in its path of travel between tube and groove. This phenomenon, per Newton's Laws of Motion, will give rise to a discrete and measurable amount of force energy required to instantaneously change the path of the ball. Thus, it will be appreciated that when a continuous flow of balls undergoes an abrupt change in directional path, a cummulative and significant amount of energy is consumed, hence lost, as noise and heat. Ideally, an efficient system design would avoid any abrupt directional changes.

Figure 5:
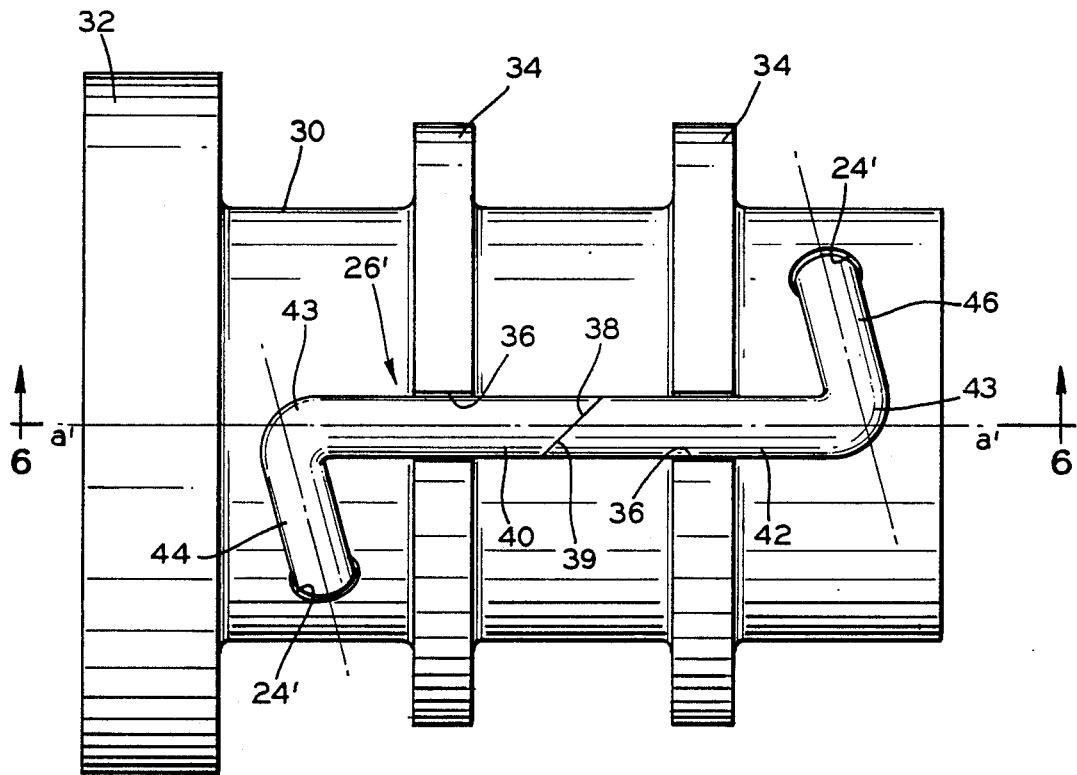
FIG. 5 is a plan view of a nut and return tube system constructed in accordance with a preferred embodiment of the present invention.
Figure 6:
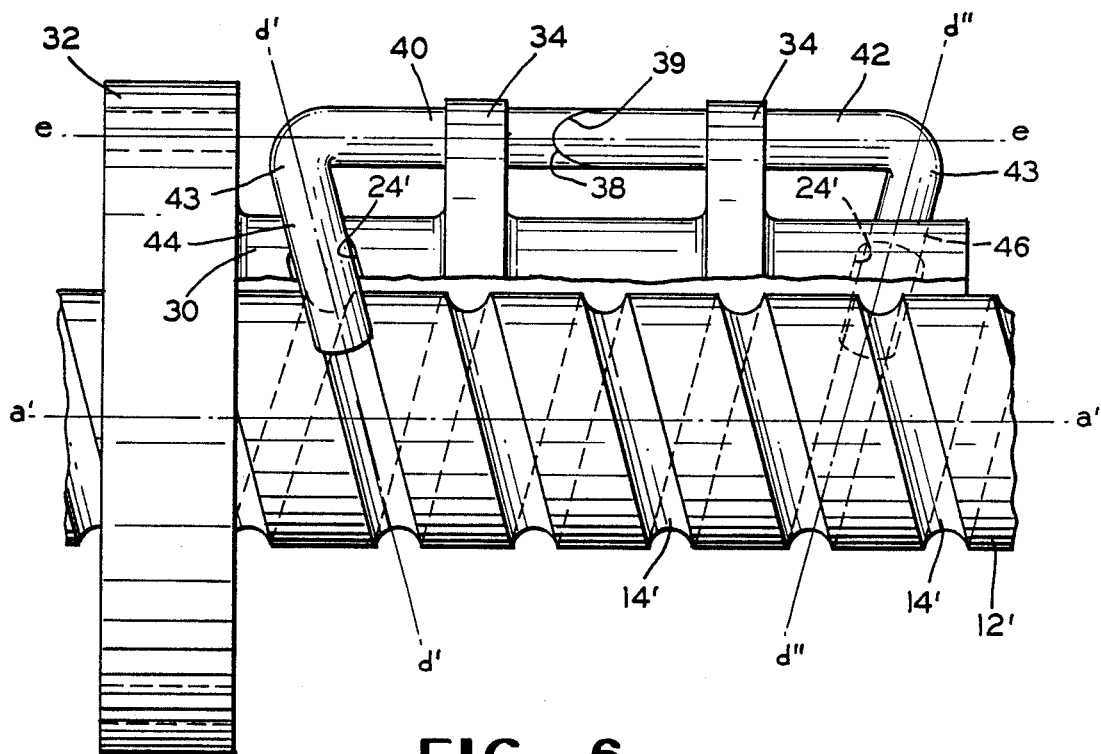
FIG. 6 is a cross-sectional view along lines 6—6 of FIG. 5, wherein a screw has been added to the view, the nut shown only fragmentarily.
Figure 7:
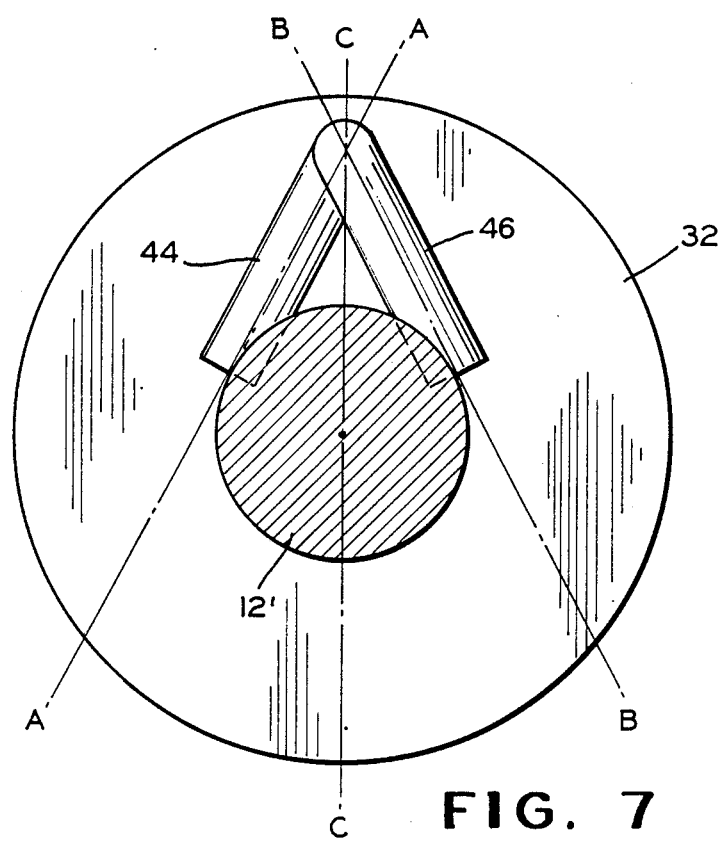
FIG. 7 is a fragmentary end view of the screw and the legs of the return tube, showing spacial relationships in the presently preferred embodiment.

In the present invention, such abrupt changes are avoided by assuring that all angles of the travel path are at least equal to or greater than the diameter of the balls; the greater the angle, the better. Referring now to FIGS. 5, 6 and 7, practice of the present invention requires the combination of an improved nut, as well as an improved return tube.

Referring particularly to FIG. 5, an improved nut 30 includes an actuator end flange 32 and a pair of smaller tube support flanges 34 positioned intermediately along the nut body. The support flanges contain slots 36 for accommodating major legs 40,42 of the return tube 26'. Alternatively, an axially extending groove in the surface of the nut can be utilized for the latter purpose. The improved tube 26' is preferably formed of two identical members, each having a major leg 40, 42 and a minor leg 44, 46, as shown. The major legs 40,42, each integrally coupled to a respective minor leg 44,46 by an elbow 43, are positioned over the exterior of the nut 30 in an axially aligned, abutting, end-to-end relationship, and, as shown, are oriented along the axis a'—a' of the nut. The ends 38,39 of the major legs 40,42 abut together in the preferred embodiment at complementary oblique angles to the axis a'—a', as also shown. The use of oblique angles facilitates alignment of the major legs after initial insertion of the minor legs 44,46 into respective apertures 24'. Although convenient, the use of oblique angles is not, however, mandatory in the practice of the present invention. In addition, the use of major legs 40,42 of equal lengths, although preferable, is not mandatory.

As will be apparent by further reference to FIG. 5, the angle between major and minor legs of each return tube member is acute; not orthogonal as is the angle between corresponding tube ends 25, 27 and major body portion 23 of the prior art tube 26 (FIG. 4). In the present invention, the latter angle will always be ninety degrees minus the helix angle. For example, if the helix angle is thirty degrees, the angle between major and minor legs will be ninety minus thirty; hence, sixty degrees.

Referring now to FIG. 6, it will be apparent that the orientation of the minor legs 44,46 along respective groove helix angles will avoid the abrupt travel path changes of the balls as noted in reference to the prior art embodiment of FIG. 4. Although the nut 30 is shown only fragmentarily in FIG. 6, it will be appreciated that the apertures 24', which provide counterbores sized for receiving respective minor legs, have orientations parallel to the helix angles of the groove 14' at their points of intersection. As noted previously, the balls travelling in the return tube system of the present invention will never undergo abrupt angular changes of direction in transiting from return tube to groove and vice versa.

Finally, referring to FIG. 7, it will be noted that the minor legs 44,46 lie in planes A—A and B—B, respectively. The latter planes are separate and distinct from a plane C—C which passes through the centerline e—e (FIG. 6) of the major legs 40, 42 and through the centerline of the screw 12'. Thus it will be apparent that the centerlines d' and d" of the minor legs intersect, but lie outside of, the plane c—c. For convenience, the planes are shown end-wise only, and the respective lines A—A, B—B, and C—C represent end views of each represented plane.

Although only one preferred embodiment has been detailed and described herein, the following claims are envisioned to cover numerous other embodiments which fall within their spirit and scope.

What is claimed is:

1. In a ball screw assembly including an axially extending elongated screw, said screw defining an exterior helical groove, said assembly including a nut adapted for axial movement along said screw, said nut defining an interior mating helical groove, said assembly further including a plurality of ball bearings adapted to traverse a helical path in said nut between the grooves of said nut and said screw from one end of said nut to the other, said nut containing a pair of spaced apertures extending transversely to said screw, each aperture extending from said interior mating groove to the exterior of said nut, and a ball bearing return tube secured to said nut to provide recirculation of said ball bearings from one of said apertures to the other, said tube engaging said spaced transverse apertures; an improvement comprising: (a) each of said apertures in said nut is oriented parallel to the helix angle of the mating groove in said nut and tangent to said mating groove, and (b) said ball return tube comprises first and second members, each member having a major leg and a minor leg integrally joined together, each minor leg engaging one of said transverse apertures of said nut, wherein said major legs are positioned over the exterior of said nut in an axially aligned relationship, each of said minor legs forming an acute angle to its respective major leg, wherein said apertures comprise counterbores sized for receiving said minor legs, wherein said minor legs provide passage of said balls (a) tangent to said helical groove in said nut, and (b) parallel to the helix angle of said mating groove in said nut, wherein the centerlines of said major and minor legs of said first member of said return tube lie in a first plane, wherein the centerlines of said major and minor legs of said second member lie in a second plane, wherein said first and second planes are separate and distinct, wherein the centerlines of said major legs, and the axes of said nut and said screw are all parallel and lie in a third plane, wherein centerlines of said minor legs intersect but lie outside of said third plane, wherein said first and second planes intersect said third plane along a line coincident with the centerline of said major legs, wherein said first and second planes form equal but opposite angles with said third plane, wherein said acute angle between said major and minor legs is equal to ninety degrees minus the helix angle of said mating groove in said nut, wherein each of said minor legs is integrally coupled to a major leg by an elbow, and wherein said nut comprises a pair of axially paced circumferentially extending flanges positioned intermediately along said nut, said flanges having slots adapted to accommodate said major legs.

2. The ball screw assembly of claim 1 wherein said major legs of said members are equal in length.

3. The ball screw assembly of claim 1 wherein said axially aligned major legs have abutting ends, and wherein said ends are formed at complimentary oblique angles with respect to said centerline of said major legs.

* * * * *